United States Patent
Asakura et al.

[11] Patent Number: 5,878,297
[45] Date of Patent: Mar. 2, 1999

[54] CAMERA WITH GUIDERAILS SHAPED TO PROVIDE FILM FLATNESS IN THE IMAGE REGION

[75] Inventors: Yasuo Asakura, Hachioji; Shinya Takahashi, Kodaira, both of Japan

[73] Assignee: Olympus Optical Co., Ltd., Tokyo, Japan

[21] Appl. No.: 693,213

[22] PCT Filed: May 28, 1996

[86] PCT No.: PCT/JP96/01426

§ 371 Date: Oct. 15, 1996

§ 102(e) Date: Oct. 15, 1996

[87] PCT Pub. No.: WO96/38761

PCT Pub. Date: May 12, 1996

[30] Foreign Application Priority Data

Jun. 1, 1995 [JP] Japan ................................. H7-134880

[51] Int. Cl.[6] .............................. G03B 1/00; G03B 17/00
[52] U.S. Cl. ........................... 396/415; 396/440; 396/535
[58] Field of Search .................................... 396/415, 439, 396/440, 535; 352/221, 224, 225, 228

[56] References Cited

U.S. PATENT DOCUMENTS

| | | | |
|---|---|---|---|
| 1,957,904 | 5/1934 | Ord | 352/221 |
| 2,192,692 | 3/1940 | Nerwin | 352/221 |
| 3,387,546 | 6/1968 | Winkler et al. | 396/415 |
| 4,933,693 | 6/1990 | Beach | 306/440 |
| 5,097,278 | 3/1992 | Tamamura et al. | 396/440 |
| 5,251,840 | 10/1993 | Niedospial | 396/512 |

FOREIGN PATENT DOCUMENTS

| | | |
|---|---|---|
| 2-61625 | 3/1990 | Japan . |
| 4-214544 | 12/1990 | Japan . |
| 5-45801 | 2/1993 | Japan . |
| 8-110571 | 4/1996 | Japan . |

*Primary Examiner*—Eddie C. Lee
*Attorney, Agent, or Firm*—Louis Weinstein

[57] ABSTRACT

In a camera using a cartridge (1) which includes flexible flanges (5), (6) having loose film wind preventive annular juts and being formed at both ends of a spool (3) in the cartridge, and in which pressing forces operate on film in a width direction of the film due to the juts of the flanges, curl leveling forces to be applied to deformed portions of the film caused by the pressing forces are reduced by means of concave surfaces (9c), (9e) formed at given locations on rail planes (9a) and feed walls (9d) constituting a film feed path, and good film flatness is thus ensured.

6 Claims, 7 Drawing Sheets

CAMERA WITH GUIDERAILS SHAPED TO PROVIDE FILM FLATNESS IN THE IMAGE REGION

TECHNICAL FIELD

The present invention relates to a camera, and more particularly, to a camera to which a photographic film cartridge that is of a photographic film feed type and that has a structure for preventing loose film wind is adapted.

BACKGROUND ART

In the past, photographic film cartridges disclosed in U.S. Pat. No. 5,251,840 and Japanese Unexamined Patent Publication No. 5-45801 have been known as photographic film cartridges capable of feeding photographic film stowed in a cartridge when the photographic film cartridge is loaded in a camera.

In the conventional photographic film cartridge, flanges molded using a flexible raw material are engaged with both ends of a spool, about which photographic film is wound, within the cartridge. Juts of annular tongues molded unitedly along the margins of the flanges are used to wrap part of the outermost circumference of the photographic film wound about the spool from both ends of the film. Thus, loose wind of photographic film is prevented.

When the spool is rotated in a feed direction, the photographic film rotates together with the spool without being wound loosely. In the vicinity of a film port of a cartridge body, the photographic film is fed outside while thrusting the juts in a film-width direction.

The details of the structure of the foregoing conventional photographic film cartridge, and the film feed operation will be described in conjunction with the sectional view of a cartridge of FIG. 7 and the view showing a film feed path of FIG. 8 in which a camera in which film feed is under way is viewed from behind.

In a cartridge 101, photographic film 102 is, as shown in FIG. 7, stowed in a cartridge body 101a and wound about a spool 103 in the cartridge body 101a. Flanges 105 and 106 molded using a flexible raw material are respectively engaged with opposite ends of the spool 103 in the cartridge. Annular juts 105a an 106a, for preventing loose winding of the film 102, are formed unitedly along the outer margins of the flanges 105 and 106.

The film 102 fed from the cartridge 101 having the foregoing structure to a camera passes, as shown in FIG. 8, behind a photographic aperture 108 of the camera and is then wound about a spool 107 in the camera. At this time, the annular juts 105a and 106a of the flanges 105 and 106 are elastically deformed to be thrust in a width direction of the film in the vicinity of a film port 104 by means of the film 102. The annular juts 105a and 106a thus apply respectively pressing forces F and F' to the film. The deformed portions of the juts 105a and 106a are denoted by reference numerals 105b and 106b. A perforation 102a is formed by piercing the film 102 at given intervals along one edge of the film 102 in the width direction thereof.

When the conventional photographic film cartridge 101 is employed in a camera, as mentioned above, the film 102 receives the pressing forces F and F' resulting from elastic deformation of the flanges 105 and 106 in the vicinity of the film port 104. If the camera is left intact in this state for a long period of time, the film 102 undergoes deformation, which disables the film from being reset soon, because the pressing forces F and F' have operated on the film for the aforesaid long period of time.

FIGS. 9 and 10 show a section of the film in the width direction thereof. FIG. 9 shows the section of the film in a normally curled state in which the film does not receive the pressing forces F and F'. FIG. 10 shows a curled state of the film after the film has received the pressing forces F and F' shown in FIG. 8 for a prolonged period of time.

In FIGS. 9 and 10, the emulsion-coated side of the film 102 is denoted by reference numeral 102b. In general, the photographic film 102 has a curling characteristic that the emulsion-coated side 102b becomes concave. As shown in FIG. 9, the magnitude C1 of a curl in the normally deformed state is within a given range. As shown in FIG. 10, the emulsion-coated side 102b of the film 102 having received the pressing forces F and F' for a prolonged period of time also becomes concave. However, a large curl of a magnitude C2 exceeding the aforesaid given range occurs.

FIGS. 11 and 12 are views showing an 11/12-11'/12' section of an aperture shown in FIG. 8. FIG. 11 is a sectional view showing a state in which, when film in the normal deformed state shown in FIG. 9 is fed, the film 102 in the photographic aperture 108 is leveled by a platen 110. FIG. 12 shows a state in which after the camera is left intact for a long period, when a deformed region of the film corresponding to the next frame 102c (See FIG. 8), which has been deformed due to pressing, reaches the photographic aperture 108 with one-frame wind, the deformed region of the film 102 in the photographic aperture 108 is leveled by the platen 110.

As shown in FIGS. 11 and 12, a pair of known film rail planes 109a and a pair of known platen rail planes 109b are located above and below the photographic aperture 108 formed in a camera body 109. The platen 110 for pressing the film is pressurized to come into contact with the platen rail planes 109b.

The emulsion-coated back side of the film 102 in the normal state shown in FIG. 9 is substantially in contact with the platen 110 within the photographic aperture and retains a relatively good flat state. Even if the film 102 warps relative to the platen 110 due to deformation caused by a difference of the film 102 from another film or a change of use environments, as shown in FIG. 11, the magnitude Z1 of the warp is within a range equal to or smaller than, practically, substantially 0.02 mm.

However, when a curled portion that has received the pressing forces F and F' for a long period of time and deformed greatly is pressed by the platen 110 and thus leveled, the center curl is greatly repulsed from the platen 110. The film 102 juts out by a significant amount in a forward direction of the camera from the platen 110 as shown in FIG. 12.

As a practical example, an example, in which the pressing forces F and F' are set to about 30 g, and the film 102 in which a polyethylene naphthalate of about 0.09 mm thick is used as a film base material is left intact (in the position shown in FIG. 8) for 24 hours, will be described. Immediately after the film is wound by one frame in the pressed state, the magnitude Z2 of a warp in the center of the film on which the pressing forces operate ranges from 0.03 to 0.10 mm.

When photography is performed in this state, since the image formation side of a lens and the sensitized side of the film are mismatched greatly along an optical axis in the center of a picture area, a photograph that is out of focus is taken.

The present invention attempts to solve the foregoing drawback. An object of the present invention is to provide a camera to which a photographic film cartridge of a feed type in which pressing forces working in a width direction operate on photographic film is adaptable, and in which even after the photographic film is left intact in the camera for a prolonged period of time, the influence of deformation occurring in the film is limited and in-focus photography can be achieved.

DISCLOSURE OF THE INVENTION

A first camera in accordance with the present invention uses a photographic film cartridge which comprises a spool about which photographic film is wound, a cartridge body in which the spool is stowed freely rotatably, and flexible flanges formed at both ends of the spool; in which juts molded unitedly and annularly along the margins of the flanges wrap part of the outermost circumference of the photographic film from at both ends of the photographic film so as to prevent loose winding; and in which the juts are deformed to be thrust in a width direction of the photographic film in the vicinity of a port for photographic film of the cartridge body, and the photographic film is thus led out. The camera is characterized in that:

concave parts are formed as parts of a film feed path at positions in the cartridge at which regions of the photographic film to which loads are applied are stopped after being wound one-frame.

A second camera in accordance with the present invention is based on the first camera in which the film feed path includes a pair of film rail planes that when the photographic film led out from the cartridge is fed, receives the face of the film in a feed direction, and a pair of platen rail planes formed outside the pair of film rail planes and used to guide the film width, are characterized in that:

the concave parts are formed as parts of the film rail planes constituting the film feed path.

Furthermore, a third camera in accordance with the present invention is based on the second camera and characterized in that second concave parts are also formed as parts of a pair of film feed walls interposed between the film rail planes and platen rail planes near outer ends of the concave parts formed on the film rail planes.

According to the first camera, even after the photographic film stowed in the cartridge loaded in the camera is left intact for a long period of time in a loaded state with loads applied in the film-width direction at substantially constant positions in the cartridge, the good flatness of the photographic film is ensured over an entire picture area, and in-focus photography can thus be achieved.

According to the camera of the second invention, since the concave parts are formed as parts of the pair of film rail planes, even after the film is left intact for a long period of time in a loaded state, good flatness of the photographic film is ensured over an entire picture area, and in-focus photography can thus be achieved.

According to the camera of the third invention, based on the foregoing camera, since the second concave parts are also formed as parts of the pair of film feed walls, even after the film is left intact for a long period of time in a loaded state, good flatness of the photographic film is ensured more reliably over an entire picture area, and in-focus photography can thus be achieved.

BEST MODE FOR CARRYING OUT THE INVENTION

An embodiment of the present invention will be described in conjunction with the drawings below.

Figure 1:
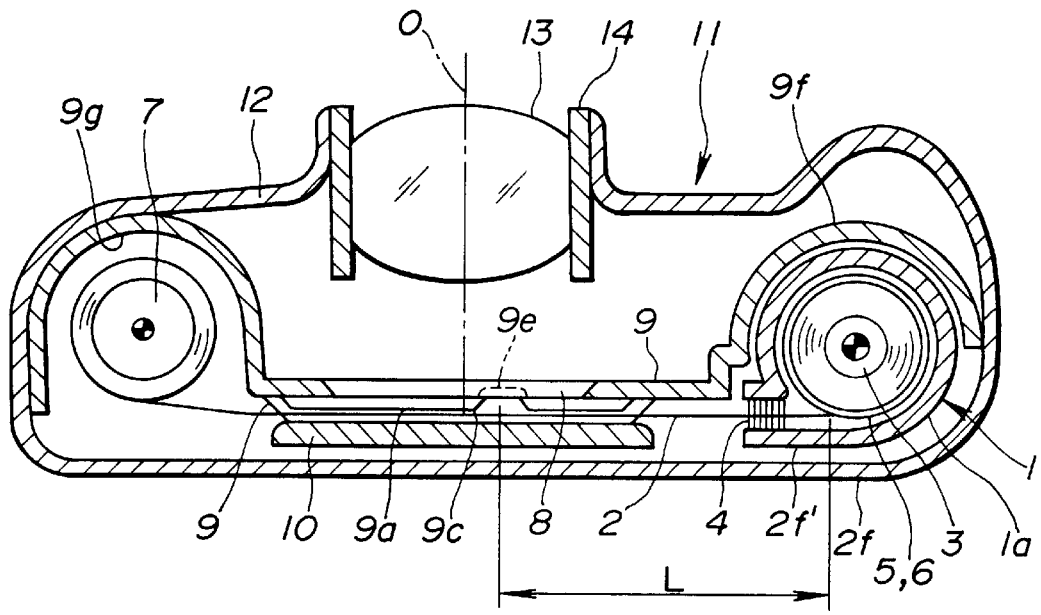
FIG. 1 is a cross-sectional view of a camera showing an embodiment of the present invention.
Figure 2:
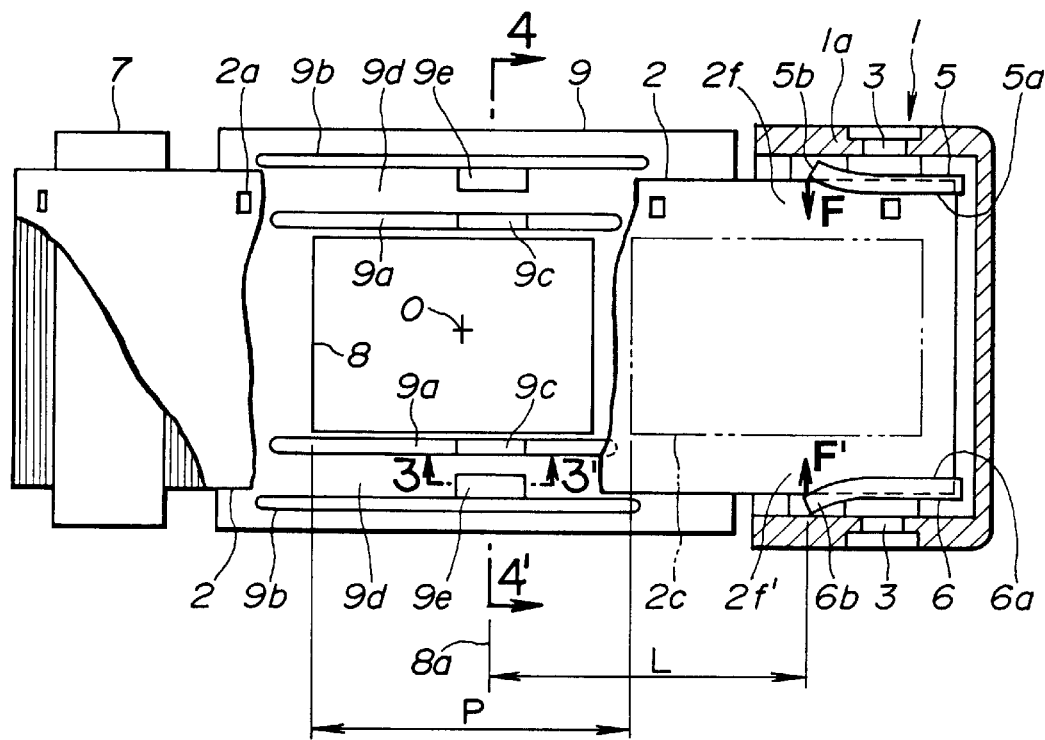
FIG. 2 is a view of a film feed path in which the camera shown in FIG. 1, in which film feed is under way, is viewed from behind.

FIG. 1 is a cross-sectional view in which a camera of an embodiment of the present invention is viewed from above, and FIG. 2 is a view of a film feed path in which the camera in which film feed is under way is viewed from behind.

A camera 11 has a photographic lens 13 supported by a lens frame 14. A cartridge chamber 9f in which a photographic film cartridge 1 can be stowed is located in the right-hand area of a camera body 9, and a spool chamber 9g having a film wind spool 7 is located in the left-hand area thereof. The outer side of the camera body 9 is enclosed with a housing 12.

A photographic aperture 8 is opposed to the photographic lens 13. A platen 10 is opposed to the photographic aperture 8. A pair of film rail planes 9a constituting a feed path in a thickness direction of film, and a pair of platen rail planes 9a for photographic film width-direction guide rails which abut on the platen 10 outside the film rail planes 9a are arranged above and below the photographic aperture 8 in the camera body 9.

Figure 7:
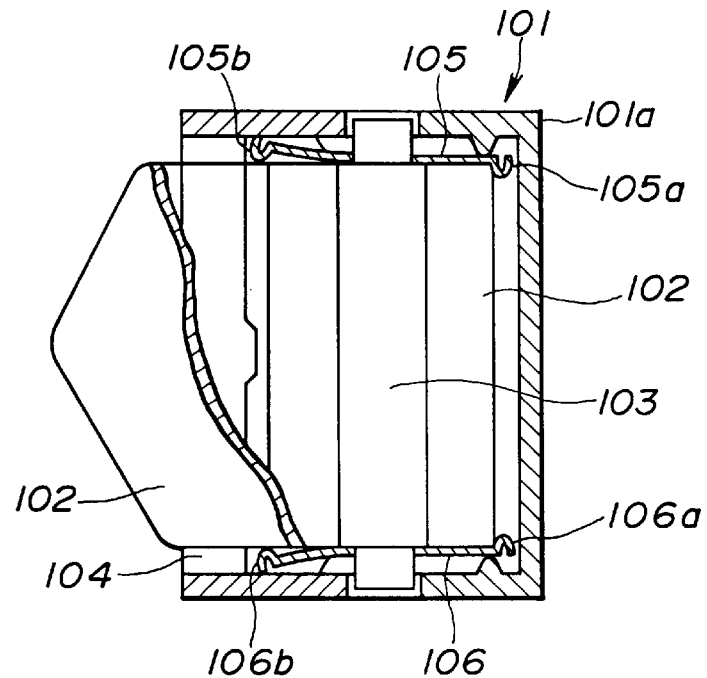
FIG. 7 is a longitudinal sectional view of a conventional feed-type photographic film cartridge.
Figure 8:
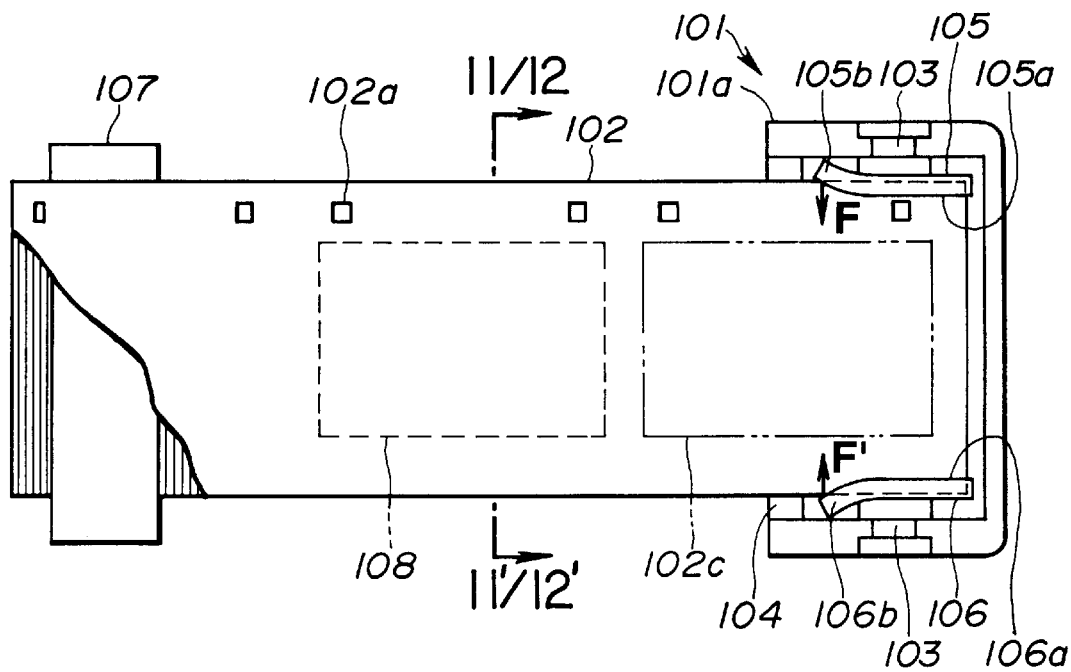
FIG. 8 is a view of a film feed path in which a conventional camera to which the photographic cartridge shown in FIG. 7 and in which film feed is under way is adapted is viewed from behind.
Figure 9:
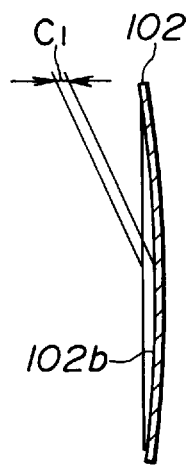
FIG. 9 is a view showing a section in a width direction of conventional film and a curled state of the film in a normal state.
Figure 10:
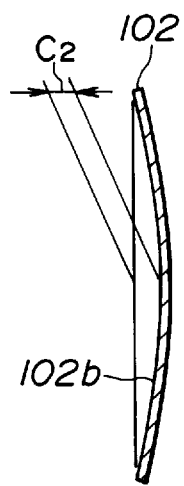
FIG. 10 is a view showing a section in a width direction of conventional film and a curled state of the film after the film has received pressing forces working in the width direction for a long period of time.

The photographic film cartridge 1 has a structure such that, after the cartridge is loaded in the camera, when a spool 3 in the cartridge is rotated, the photographic film can be fed out from the cartridge and wound about the spool 7 in the camera. The photographic film cartridge 1 has the same loose film wind preventive structure as the conventional cartridge 101 described in conjunction with FIG. 7.

To be more specific, the photographic film 2 in the photographic film cartridge 1 is, as shown in FIG. 2, stowed in the cartridge body 1a and wound about the spool 3 in the cartridge. Flanges 5 and 6 which are molded using a flexible raw material, engage opposite ends of the spool 3 in the cartridge. Annular juts 5a and 6a for preventing loose winding of the film 2 are formed unitedly along the outer margins of the flanges 5 and 6.

The film fed from the cartridge to the camera passes behind the photographic aperture 8 of the camera and is wound about the spool 7 in the camera. At this time, in the vicinity of a film port 4 of the cartridge case 1a, the flanges 5 and 6 are elastically deformed and thrust in the width direction of the film by means of the film 2. Due to the deformation, pressing forces F and F' operate on pressing force operation regions 2f and 2f' of the film. The deformed portions of the juts 5a and 6a are denoted by reference numerals 5b and 6b.

Incidentally, a perforation 2a is formed by piercing the film 2 at given intervals along one edge of the film in the width direction thereof.

In the camera 11 of this embodiment, when preparations are made for photography in order to feed film after previous photography, a portion of the film corresponding to the next frame 2c is moved by a frame feed pitch P and then stopped when aligned coincidentally with the photographic aperture 8. Likewise, the pressing force operation regions 2f and 2f' of the photographic film 2 are moved by a magnitude L of a movement that is a length substantially equal to the feed pitch P, and positioned on a line 8a within the range of the photographic aperture 8.

Figure 3:
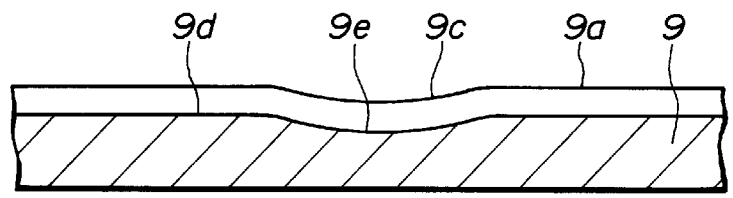
FIG. 3 is a 3-3' sectional view of FIG. 2.

In the camera body along the line 8a, as shown in FIG. 3 showing the 3-3' section of FIG. 2, a pair of concave surfaces 9c and 9e, that are arc-shaped curved-surface recesses and serve as film escapes, are formed on a pair of film rail planes 9a and on a pair of film feed wall planes 9d interposed between the film rail planes 9a and platen rail planes 9b.

The line 8a, indicating the positions of the concave surfaces 9c and 9e in a feed direction, is determined with a position in the camera body 9 at which the cartridge chamber 9f is located. Every time a one-frame feed of film is executed, the pressing force operation regions 2f and 2f' of the film 2 reach the line 8a.

Next, a fed state of the camera of the embodiment having the foregoing components will be described.

As shown in FIG. 2, assuming that the photographic film 2 is left intact for a long period of time with part of the film 2 fed, and then photography is carried out again, since the film 2 has received the pressing forces F and F' in a width direction thereof for a long period of time, a section of the film along a line linking the pressing force operation regions 2f and 2f' is curled more greatly than it usually is.

Figure 4:
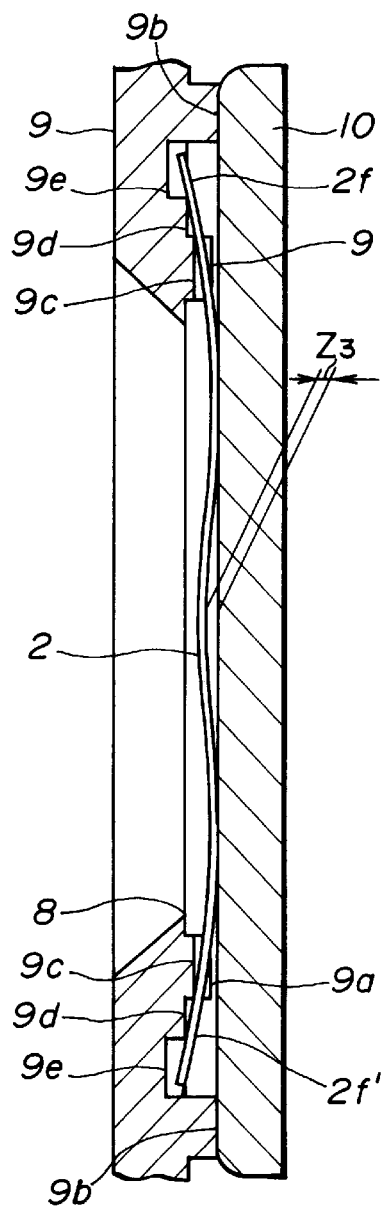
FIG. 4 is an 4-4' sectional enlarged view of FIG. 2.

In case one-frame feed is executed, the section of the film 2 along the line linking the pressing force operation regions 2f and 2f' after the one-frame feed is completed becomes as shown in FIG. 4 of an a 4-4' sectional enlarged view of FIG. 2. As shown in FIG. 4, the concave surfaces 9c of the film rail planes 9a and the concave surfaces 9e of the feed walls 9d work as escapes of the deformed pressing force operation regions 2f and 2f' of the film 2, and the pressing force operation regions 2f and 2f' are therefore not forcibly leveled but held.

Figure 12:
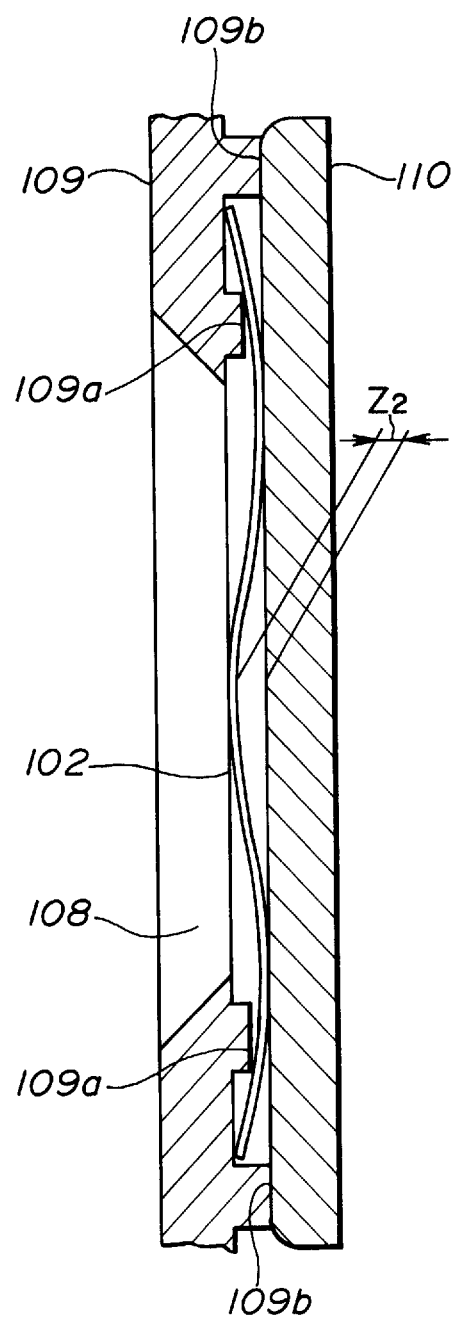
FIG. 12 is a view showing a section of the film in a deformed state shown in FIG. 10 which is fed in the conventional camera shown in FIG. 8 and lies in the aperture of the camera.

It will therefore not take place that a curled portion of film is, as described in conjunction with FIG. 12, pressed by large leveling forces and warped forward of a camera. The film 2 undergoes only a small magnitude Z3 of a warp that does not adversely affect photography, and maintains relatively good flatness.

A film exposure frame portion that is the same as the one fed by one-frame; that is, regions of the film 2 opposed to the photographic aperture 8 except the pressing force operation regions 2f and 2f', are curled normally and leveled properly by the film rail planes 9a and platen 10.

As for a whole portion of film corresponding to a whole frame and coinciding with the photographic aperture 8, good flatness can be ensured. Since good flatness is ensured, well-focused photography can be achieved.

Figure 11:
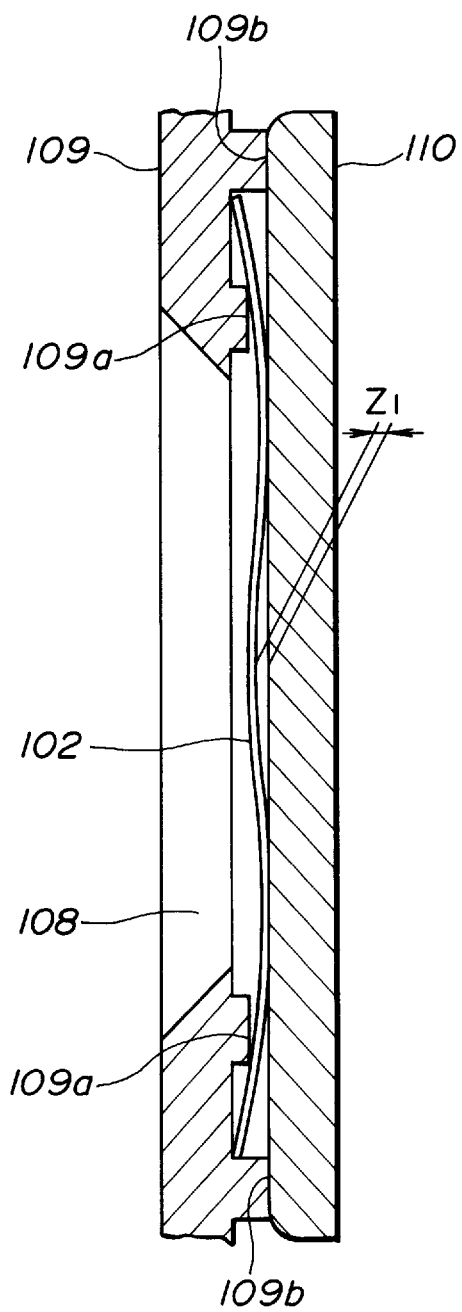
FIG. 11 is a view showing a section of the film in a normal deformed state shown in FIG. 9 which is fed in the conventional camera shown in FIG. 8 and lies in an aperture of the camera.

If the concave surfaces 9c and 9e have proper concave dimensions allowing the concave surfaces 9c and 9e to substantially recede from the film 2, the magnitude Z3 of a warp in the center of film in a width direction thereof is so small that the flatness in the center thereof can be substantially equal to that of the film in a normal state which has been described in conjunction with FIG. 11.

By contrast, when the camera of this embodiment is used to perform photography continually without any period of storage, the pressing forces F and F' do not operate on the film for a long period of time. The film 2 that has not undergone deformation of curling but remains normal is fed, and an exposure frame portion thereof is opposed to the photographic aperture 8. The normally-curled film 2 is leveled by the film rail planes 9a located back and forth in a film feed direction and the platen 10 despite the presence of the concave surfaces 9c formed as parts of the planes near the center in a width direction of the camera and the concave surfaces 9e. Good flatness is ensured for a whole picture area. Well-focused photography can be achieved.

In the camera of this embodiment, since the concave surfaces 9c and 9e are formed within the range of the photographic aperture 8, the cartridge chamber 9f can be located at a position near the photographic aperture 8. The camera can therefore be designed to be compact.

Moreover, since the concave surfaces 9c and 9e are, as mentioned above, curved surfaces, an effect that dust or the like stemming from film feed is hard to accumulate on the concave parts is exerted.

Next, a variant of the concave surfaces in the camera of the embodiment will be described.

In the aforesaid conventional camera, the concave surfaces 9c and 9e of curved-surfaces are formed on the film rail surfaces 9a and feed walls 9d respectively. A camera of this variant is characterized in that the concave surfaces have a trapezoidal section.

Figure 5:
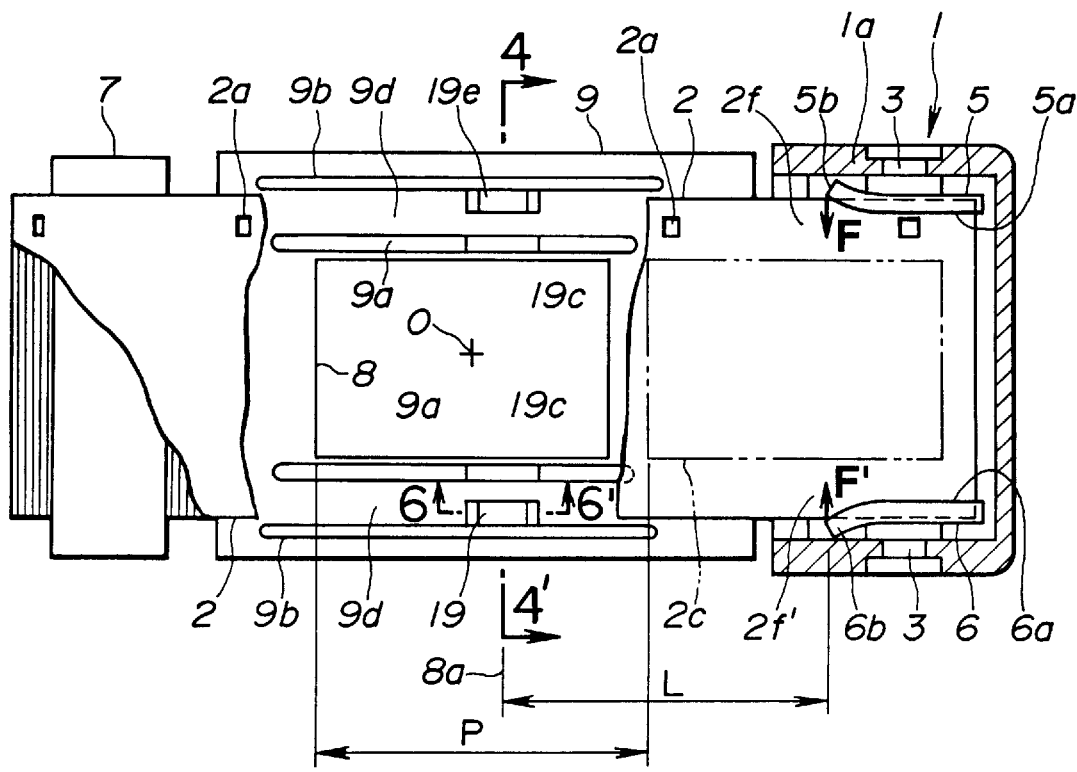
FIG. 5 is a view of a variant of the camera shown in FIG. 1 in which the camera in which film feed is under way is viewed from behind.
Figure 6:
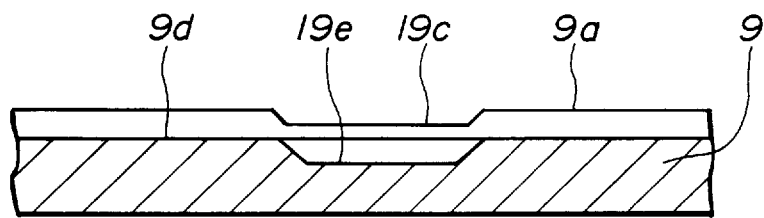
FIG. 6 is a 6-6' sectional view of FIG. 5.

FIG. 5 is a view of a film feed path in which the camera of the variant is viewed from behind the camera in which film feed is under way. FIG. 6 is a 6-6' sectional view of FIG. 5 showing the shapes of concave surfaces.

A description will be made on the assumption that the components of the camera of this variant except the concave surfaces of the film rail planes and feed walls and an adaptable photographic film cartridge are identical to those of the aforesaid embodiment, and that the component members are assigned the same reference numerals as those of the aforesaid embodiment.

Even in the camera of this variant, the film 2 has the pressing force operation regions 2f and 2f' on which the pressing forces F and F' stemming from deformation of the flanges 5 and 6 of the cartridge 1 operate. Concave surfaces 19c and 19e having a trapezoidal section as shown in the sectional view of FIG. 6 are formed on the pair of film rail planes 9a and the pair of feed walls 9d along the line 8a transverse the photographic aperture 8 which is separated by a length L corresponding to a one-frame feed pitch P from a line linking the regions 2f and 2f'. A cartridge chamber is located in the camera body 9 so that these surfaces and planes will be arranged to have the above relationships.

As mentioned above, the concave surfaces 19c and 19e are shaped to have a trapezoidal section. By adopting this shape, even after the photographic film is left intact for a long period of time, good flatness can be ensured reliably for all exposure frames and all kinds of film.

Specifically, with a difference between exposure frames, for example, between the second frame and 36th frame, a difference in inner diameters of a cartridge, for example, a difference in inner diameters of a cartridge due to a difference of a manufacturer from another, or the like, the positions of the film regions 2f and 2f' to which the pressing forces F and F' are applied may be shifted slightly in a feed direction relative to the photographic aperture 8 or may be varied. Even in this case, since the bottoms of the concave parts 19c and 19e are elongated parallel to the feed surface, even if the positions of the film regions 2f and 2f' are shifted in the feed direction, the effective depths of the concave parts 19c and 19e remain unchanged. No change will therefore occur in leveling forces to be applied to a curled portion.

Film undergoes only the small magnitude Z3 of a warp, that will as shown in FIG. 4 not adversely affect photography. Relatively good flatness can be maintained, and well-focused photography can be achieved.

INDUSTRIAL APPLICABILITY

According to a camera of the present invention, after photographic film stowed in a cartridge body loaded in the camera is left intact in the camera for a long period of time with loads applied to the photographic film in a film-width direction at substantially constant positions within the cartridge, even if photography is restarted, good flatness can be ensured for a whole picture area, and well-focused photography can be achieved.

What is claimed is:

1. In combination, a camera having a cartridge chamber and a photographic film cartridge placed in said chamber, which cartridge has a spool about which photographic film is wound, a cartridge body in which the spool is stowed, said spool being free to rotate, and flexible flanges formed at opposite ends of said cartridge body; in which juts molded unitedly and angularly along margins of the flanges wrap part of an outermost circumference of the photographic film wound about the spool along opposite longitudinal sides of the photographic film and thus prevent loose winding of the film in the cartridge body; and in which in a vicinity of a photographic film port of said cartridge body, said juts are deformed by the film and thrust away from the film edges and in a width direction of the photographic film when said photographic film is led out from said film port to move behind a photographic aperture in the camera, characterized in that:

concave recesses are formed along a film feed path displaced from opposite sides of said photographic aperture and at positions at which regions of the photographic film to which loads applied by said juts when the film is at rest, are stopped after being moved a distance of one-frame, each recess receiving one of said regions which may be pressed inwardly due to said juts said film feed path in said camera including a part of film rail planes that, when the photographic film led out from said cartridge is fed, receive a face of the film in a feed direction, and a pair of platen rail planes located outside the pair of film rail planes guide the film; and said concave recesses are formed in the film rail planes constituting said film feed path, said concave recesses each having a given length in the film feed direction which length is less than a length of the film rail plane.

2. A camera according to claim 1, further comprising second concave recesses which are formed as parts of a pair of film feed walls interposed between said film rail planes and said platen rail planes positioned near to and external to the concave recesses formed on said film rail planes.

3. A camera according to claim 1, wherein said concave recesses are shaped to provide curved surfaces.

4. A camera according to claim 1, wherein said concave recesses are shaped to have a trapezoidal cross-section.

5. A camera according to claim 1, wherein said concave recesses are designed to maintain flatness of said photographic film by receiving said regions deformed by said juts in a vicinity of the photographic film port within said cartridge body which deformed regions are aligned with said recesses when the film is advanced by one film frame.

6. A camera according to claim 1, wherein said concave recesses are formed to allow portions pressed by said juts to enter said concave recesses.

* * * * *